(12) United States Patent
Lee et al.

(10) Patent No.: US 11,431,267 B2
(45) Date of Patent: Aug. 30, 2022

(54) PLURAL-FANS DRIVING APPARATUS

(71) Applicant: DELTA ELECTRONICS, INC., Taoyuan (TW)

(72) Inventors: Kuo-Ying Lee, Taoyuan (TW); Feng-Ying Lin, Taoyuan (TW); Meng-Yu Chen, Taoyuan (TW); Chia-Ching Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 173 days.

(21) Appl. No.: 16/856,743

(22) Filed: Apr. 23, 2020

(65) Prior Publication Data

US 2020/0248612 A1 Aug. 6, 2020

Related U.S. Application Data

(63) Continuation-in-part of application No. 15/132,459, filed on Apr. 19, 2016, now abandoned.

(30) Foreign Application Priority Data

Jan. 29, 2016 (CN) .......................... 201610065157.1

(51) Int. Cl.
*H02P 5/50* (2016.01)
*H02P 5/00* (2016.01)
*F01P 5/02* (2006.01)

(52) U.S. Cl.
CPC .................. *H02P 5/50* (2013.01); *H02P 5/00* (2013.01); *F01P 2005/025* (2013.01)

(58) Field of Classification Search
CPC ..................................... H02P 5/50; H02P 5/00

USPC .......................................... 318/34, 599, 560
See application file for complete search history.

(56) References Cited

U.S. PATENT DOCUMENTS

| | | | |
|---|---|---|---|
| 6,424,871 B1 | 7/2002 | Nakajima | |
| 6,747,432 B2* | 6/2004 | Yoshimura | ............ F04D 27/004 318/599 |
| 6,840,743 B2 | 1/2005 | Herke | |
| 8,853,986 B2* | 10/2014 | Wiltsch | .................... F01P 11/14 361/25 |

(Continued)

FOREIGN PATENT DOCUMENTS

CN 105141194 12/2015

OTHER PUBLICATIONS

Office Action dated Nov. 22, 2018 from corresponding application No. CN201610065157.1.

*Primary Examiner* — David Luo
(74) *Attorney, Agent, or Firm* — Muncy, Geissler, Olds & Lowe, P.C.

(57) ABSTRACT

A plural-fans driving apparatus is provided to drive a first fan and a second fan, and the first fan and the second fan are three-phase fans. The plural-fans driving apparatus includes a controller, a first three-phase motor driver structure, a second three-phase motor driver structure, and a protection and input interface circuit. The protection and input interface circuit is coupled to the first three-phase motor driver structure and the second three-phase motor driver structure, and protects the first three-phase motor driver structure and the second three-phase motor driver structure. The controller controls the first three-phase motor driver structure to drive the first fan, and controls the second three-phase motor driver structure to drive the second fan.

8 Claims, 11 Drawing Sheets

(56) References Cited

U.S. PATENT DOCUMENTS

| | | | |
|---|---|---|---|
| 8,975,845 B2* | 3/2015 | Guzelgunler | H02P 1/46 |
| | | | 318/400.22 |
| 9,685,901 B2* | 6/2017 | Tanabe | H02P 29/02 |
| 2002/0017940 A1 | 2/2002 | Fuiii | |
| 2002/0060889 A1 | 5/2002 | Teutsch | |
| 2013/0113401 A1 | 5/2013 | Ogawa | |
| 2015/0354870 A1 | 12/2015 | Lee et al. | |

* cited by examiner

US 11,431,267 B2

PLURAL-FANS DRIVING APPARATUS

CROSS-REFERENCE TO RELATED APPLICATIONS

This application is a continuation-in part application of U.S. application Ser. No. 15/132,459 filed on Apr. 19, 2016, which claims priority to CN201610065157.1 filed Jan. 29, 2016. The entire disclosure is incorporated herein by reference.

BACKGROUND OF THE INVENTION

Field of the Invention

The present disclosure relates to a fan driving apparatus, and especially relates to a plural-fans driving apparatus.

Description of the Related Art

The related art fan is used to decrease the temperature. Therefore, the related art fan is very important for the human body or the electronic product. In some conditions, a plurality of the related art fans is used to decrease the temperature at the same time in the electronic product. However, each of the related art fans comprises a controller and a protection and input interface circuit respectively. In another word, when the electronic product drives two related art fans, two controllers and two protection and input interface circuits will be required. Driving three related art fans need three controllers and three protection and input interface circuits, and so on. Therefore, when a plurality of the related art fans are arranged in the electronic product, the cost will be too high and the volume will be too large because a plurality of the controllers and protection and input interface circuits are required.

SUMMARY OF THE INVENTION

In order to solve the above-mentioned problems, an object of the present disclosure is to provide a plural-fans driving apparatus.

In order to achieve the object of the present disclosure mentioned above, the plural-fans driving apparatus drives a first fan and a second fan. The first fan and the second fan are three-phase fans. The plural-fans driving apparatus includes a controller, a first three-phase motor driver structure, a second three-phase motor driver structure, and a protection and input interface circuit. The first three-phase motor driver structure is coupled to the controller and the first fan. The second three-phase motor driver structure is coupled to the controller, the first three-phase motor driver structure, and the second fan. The protection and input interface circuit is coupled to the first three-phase motor driver structure and the second three-phase motor driver structure, and protects the first three-phase motor driver structure and the second three-phase motor driver structure. The controller controls the first three-phase motor driver structure to drive the first fan, and controls the second three-phase motor driver structure to drive the second fan.

In one embodiment, the controller generates a speed control signal to simultaneously control the first fan and the second fan through the first three-phase motor driver structure and the second three-phase motor driver structure, respectively.

In one embodiment, the speed control signal is a pulse width modulation signal.

In one embodiment, a duty cycle of the speed control signal is adjusted to control the first fan and the second fan rotating in the same speed or in different speeds.

In one embodiment, the protection and input interface circuit is coupled in parallel to the first three-phase motor driver structure and the second three-phase motor driver structure to provide a common input interface for the first three-phase motor driver structure and the second three-phase motor driver structure.

In one embodiment, the first three-phase motor driver structure is a senseless motor driver structure for driving the first fan, and the second three-phase motor driver structure is a senseless motor driver structure for driving the second fan.

In one embodiment, the first three-phase motor driver structure and the second three-phase motor driver structure are coupled in parallel to a DC voltage supply unit, and the first three-phase motor driver structure and the second three-phase motor driver structure are supplied power by the DC voltage supply unit.

In one embedment, the DC voltage supply unit is a battery.

The advantage of the present disclosure is to decrease the cost (to save cost) of the plural-fans driving apparatus and to decrease the volume (increase utilization of a circuit board) of the plural-fans driving apparatus.

DETAILED DESCRIPTION OF THE INVENTION

Please refer to following detailed description and figures for the technical content of the present disclosure. The following detailed description and figures are referred for the present disclosure, but the present disclosure is not limited to it.

Figure 1:
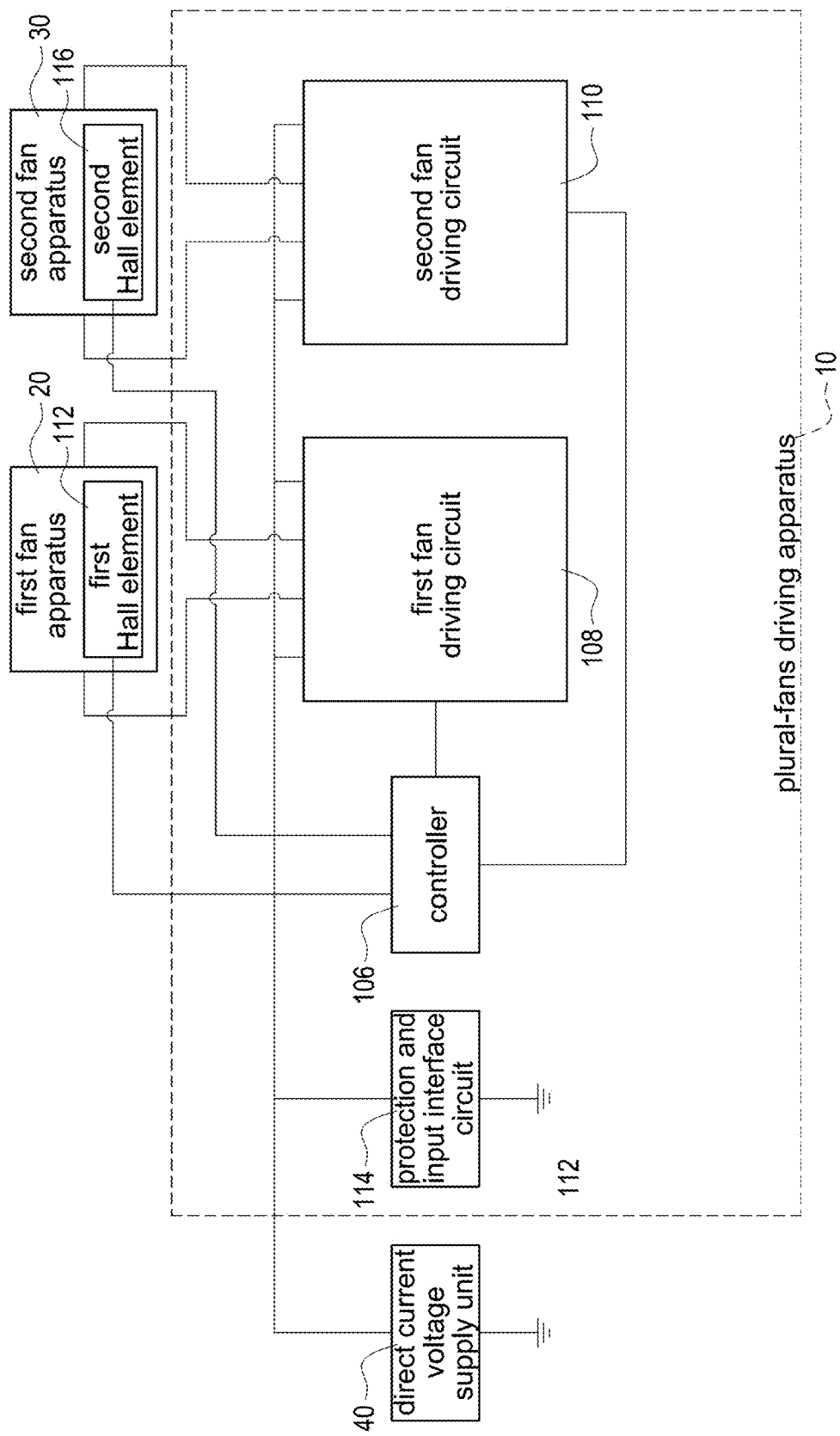
FIG. 1 shows a block diagram of the plural-fans driving apparatus of the present disclosure.

FIG. 1 shows a block diagram of the plural-fans driving apparatus of the present disclosure. A plural-fans driving apparatus 10 is applied to a direct current voltage supply unit 40. The direct current voltage supply unit 40 is, for example but not limited to, a battery. The plural-fans driving apparatus 10 is used to drive a first fan apparatus 20 and a second fan apparatus 30.

The plural-fans driving apparatus 10 comprises a controller 106, a first fan driving circuit 108, a second fan driving circuit 110 and a protection and input interface circuit 114. The first fan apparatus 20 comprises a first Hall element 112. The second fan apparatus 30 comprises a second Hall element 116.

The first fan driving circuit 108 is electrically connected to the controller 106 and the first fan apparatus 20. The second fan driving circuit 110 is electrically connected to the controller 106, the first fan driving circuit 108 and the second fan apparatus 30. The first Hall element 112 is electrically connected to the controller 106. The protection and input interface circuit 114 is electrically connected to the first fan driving circuit 108 and the second fan driving circuit 110. The second Hall element 116 is electrically connected to the controller 106.

The controller 106 controls the first fan driving circuit 108 to drive the first fan apparatus 20. The controller 106 controls the second fan driving circuit 110 to drive the second fan apparatus 30. The protection and input interface circuit 114 is used to protect the first fan driving circuit 108 and the second fan driving circuit 110. The protection and input interface circuit 114 is a common input interface for the first fan driving circuit 108 and the second fan driving circuit 110.

Moreover, the controller 106 receives, for example but not limited to, a 5 volts voltage (not shown in FIG. 1) to drive the controller 106. The first Hall element 112 and the second Hall element 116 receive a proper voltage (not shown in FIG. 1) to drive the first Hall element 112 and the second Hall element 116.

Figure 2:
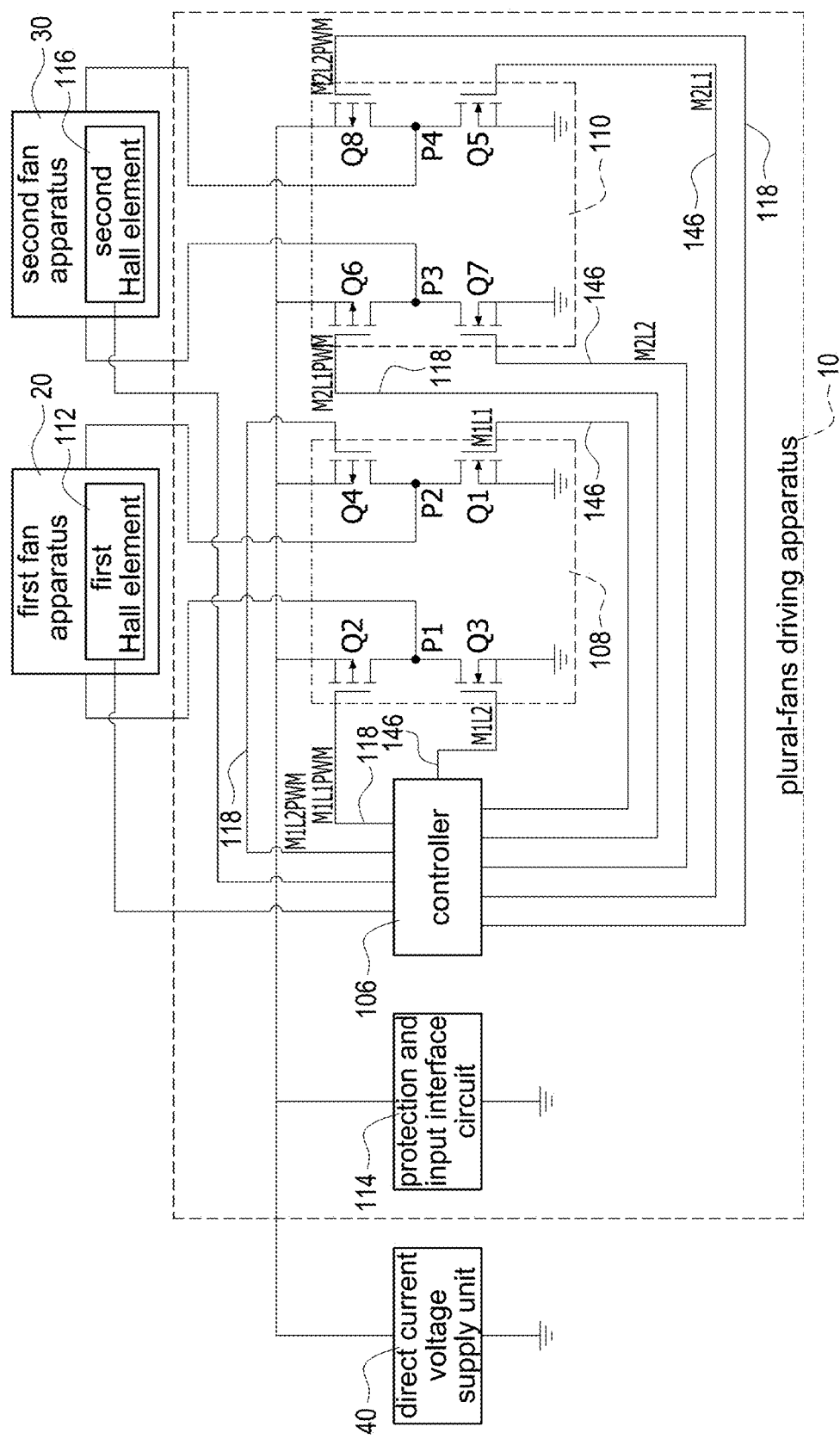
FIG. 2 shows a circuit diagram of the first embodiment of the plural-fans driving apparatus of the present disclosure.

FIG. 2 shows a circuit diagram of the first embodiment of the plural-fans driving apparatus of the present disclosure. The description for the elements shown in FIG. 2, which are similar to those shown in FIG. 1, is not repeated here for brevity.

The first fan driving circuit 108 comprises a first control line M1L1, a second control line M1L1PWM, a third control line M1L2, a fourth control line M1L2PWM, a first transistor switch Q1, a second transistor switch Q2, a third transistor switch Q3 and a fourth transistor switch Q4. The second fan driving circuit 110 comprises a fifth control line M2L1, a sixth control line M2L1PWM, a seventh control line M2L2, an eighth control line M2L2PWM, a fifth transistor switch Q5, a sixth transistor switch Q6, a seventh transistor switch Q7 and an eighth transistor switch Q8.

The first control line M1L1 is electrically connected to the controller 106. The second control line M1L1PWM is electrically connected to the controller 106. The third control line M1L2 is electrically connected to the controller 106. The fourth control line M1L2PWM is electrically connected to the controller 106. The first transistor switch Q1 is electrically connected to the first control line M1L1 and the first fan apparatus 20. The second transistor switch Q2 is electrically connected to the second control line M1L1PWM, the first fan apparatus 20 and the protection and input interface circuit 114. The third transistor switch Q3 is electrically connected to the third control line M1L2, the first fan apparatus 20 and the second transistor switch Q2. The fourth transistor switch Q4 is electrically connected to the fourth control line M1L2PWM, the first fan apparatus 20, the protection and input interface circuit 114 and the first transistor switch Q1. Moreover, the second transistor switch Q2 and the third transistor switch Q3 are electrically connected to a first common point P1. The first fan apparatus 20 is electrically connected to the second transistor switch Q2 and the third transistor switch Q3 through the first common point P1 mentioned above. The first transistor switch Q1 and the fourth transistor switch Q4 are electrically connected to a second common point P2. The first fan apparatus 20 is electrically connected to the first transistor switch Q1 and the fourth transistor switch Q4 through the second common point P2 mentioned above.

The fifth control line M2L1 is electrically connected to the controller 106. The sixth control line M2L1PWM is electrically connected to the controller 106. The seventh control line M2L2 is electrically connected to the controller 106. The eighth control line M2L2PWM is electrically connected to the controller 106. The fifth transistor switch Q5 is electrically connected to the fifth control line M2L1 and the second fan apparatus 30. The sixth transistor switch Q6 is electrically connected to the sixth control line M2L1PWM, the second fan apparatus 30 and the protection and input interface circuit 114. The seventh transistor switch Q7 is electrically connected to the seventh control line M2L2, the second fan apparatus 30 and the sixth transistor switch Q6. The eighth transistor switch Q8 is electrically connected to the eighth control line M2L2PWM, the second fan apparatus 30, the protection and input interface circuit 114 and the fifth transistor switch Q5. Moreover, the sixth transistor switch Q6 and the seventh transistor switch Q7 are electrically connected to a third common point P3. The second fan apparatus 30 is electrically connected to the sixth transistor switch Q6 and the seventh transistor switch Q7 through the third common point P3 mentioned above. The fifth transistor switch Q5 and the eighth transistor switch Q8 are electrically connected to a fourth common point P4. The second fan apparatus 30 is electrically connected to the fifth transistor switch Q5 and the eighth transistor switch Q8 through the fourth common point P4 mentioned above.

Figure 3:
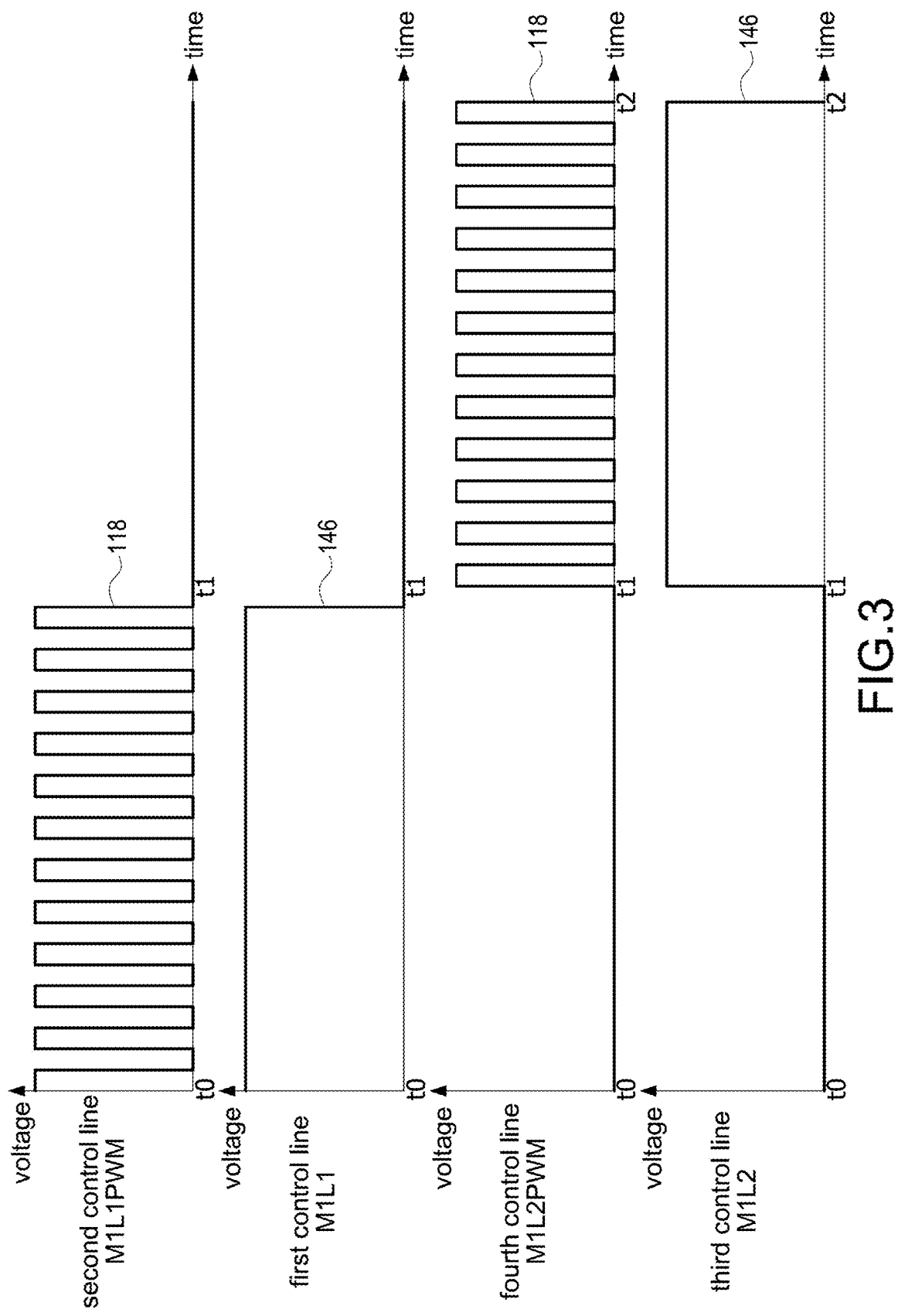
FIG. 3 shows waveform diagrams of the first embodiment of the plural-fans driving apparatus of the present disclosure.
Figure 4:
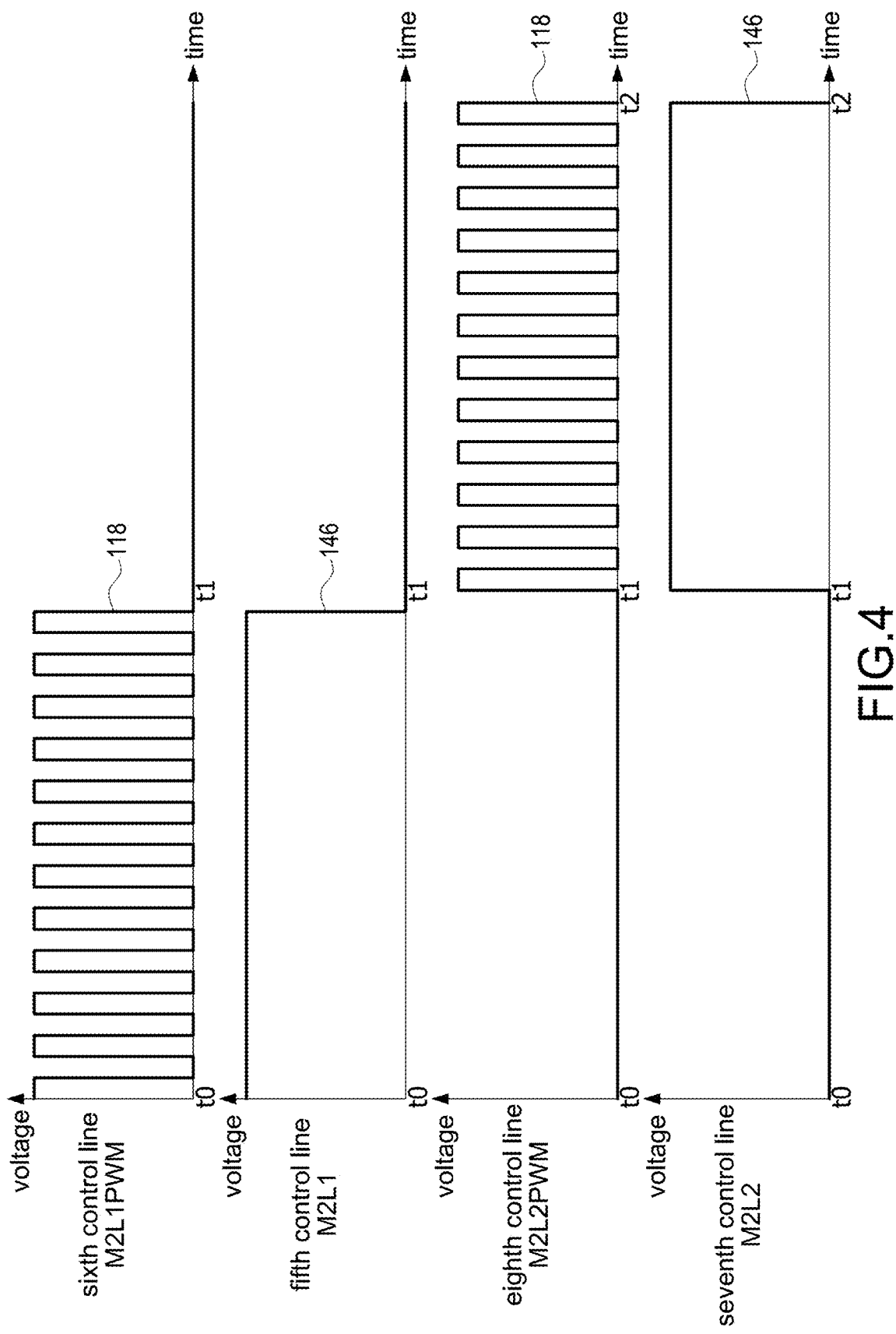
FIG. 4 shows waveform diagrams of the first embodiment of the plural-fans driving apparatus of the present disclosure.

FIG. 3 shows waveform diagrams of the first embodiment of the plural-fans driving apparatus of the present disclosure. FIG. 4 shows waveform diagrams of the first embodiment of the plural-fans driving apparatus of the present disclosure. Please refer to FIG. 2 at the same time.

Between the timing t0 and the timing t1, the controller 106 sends a conduction signal 146 through the first control line M1L1 to the first transistor switch Q1 to drive the first transistor switch Q1, and the controller 106 sends a pulse width modulation signal 118 through the second control line M1L1PWM to the second transistor switch Q2 to drive the second transistor switch Q2. Besides, between the timing t0 and the timing t1, the controller 106 does not turn on the third transistor switch Q3 and the fourth transistor switch Q4. In another word, between the timing t0 and the timing t1, the controller 106 controls the first transistor switch Q1 and the second transistor switch Q2 by the conduction signal 146 and the pulse width modulation signal 118 respectively to drive the first fan apparatus 20.

Between the timing t1 and the timing t2, the controller 106 sends the conduction signal 146 through the third control line M1L2 to the third transistor switch Q3 to drive the third transistor switch Q3, and the controller 106 sends the pulse width modulation signal 118 through the fourth control line M1L2PWM to the fourth transistor switch Q4 to drive the fourth transistor switch Q4. Besides, between the timing t1 and the timing t2, the controller 106 does not turn on the first transistor switch Q1 and the second transistor switch Q2. In another word, between the timing t1 and the timing t2, the controller 106 controls the third transistor switch Q3 and the fourth transistor switch Q4 by the conduction signal 146 and the pulse width modulation signal 118 respectively to drive the first fan apparatus 20.

Between the timing t0 and the timing t1, the controller 106 sends the conduction signal 146 through the fifth control line M2L1 to the fifth transistor switch Q5 to drive the fifth transistor switch Q5, and the controller 106 sends the pulse width modulation signal 118 through the sixth control line M2L1PWM to the sixth transistor switch Q6 to drive the sixth transistor switch Q6. Besides, between the timing t0 and the timing t1, the controller 106 does not turn on the seventh transistor switch Q7 and the eighth transistor switch Q8. In another word, between the timing t0 and the timing t1, the controller 106 controls the fifth transistor switch Q5 and the sixth transistor switch Q6 by the conduction signal 146 and the pulse width modulation signal 118 respectively to drive the second fan apparatus 30.

Between the timing t1 and the timing t2, the controller 106 sends the conduction signal 146 through the seventh control line M2L2 to the seventh transistor switch Q7 to drive the seventh transistor switch Q7, and the controller 106 sends the pulse width modulation signal 118 through the eighth control line M2L2PWM to the eighth transistor switch Q8 to drive the eighth transistor switch Q8. Besides, between the timing t1 and the timing t2, the controller 106 does not turn on the fifth transistor switch Q5 and the sixth transistor switch Q6. In another word, between the timing t1 and the timing t2, the controller 106 controls the seventh transistor switch Q7 and the eighth transistor switch Q8 by the conduction signal 146 and the pulse width modulation signal 118 respectively to drive the second fan apparatus 30.

Figure 5:
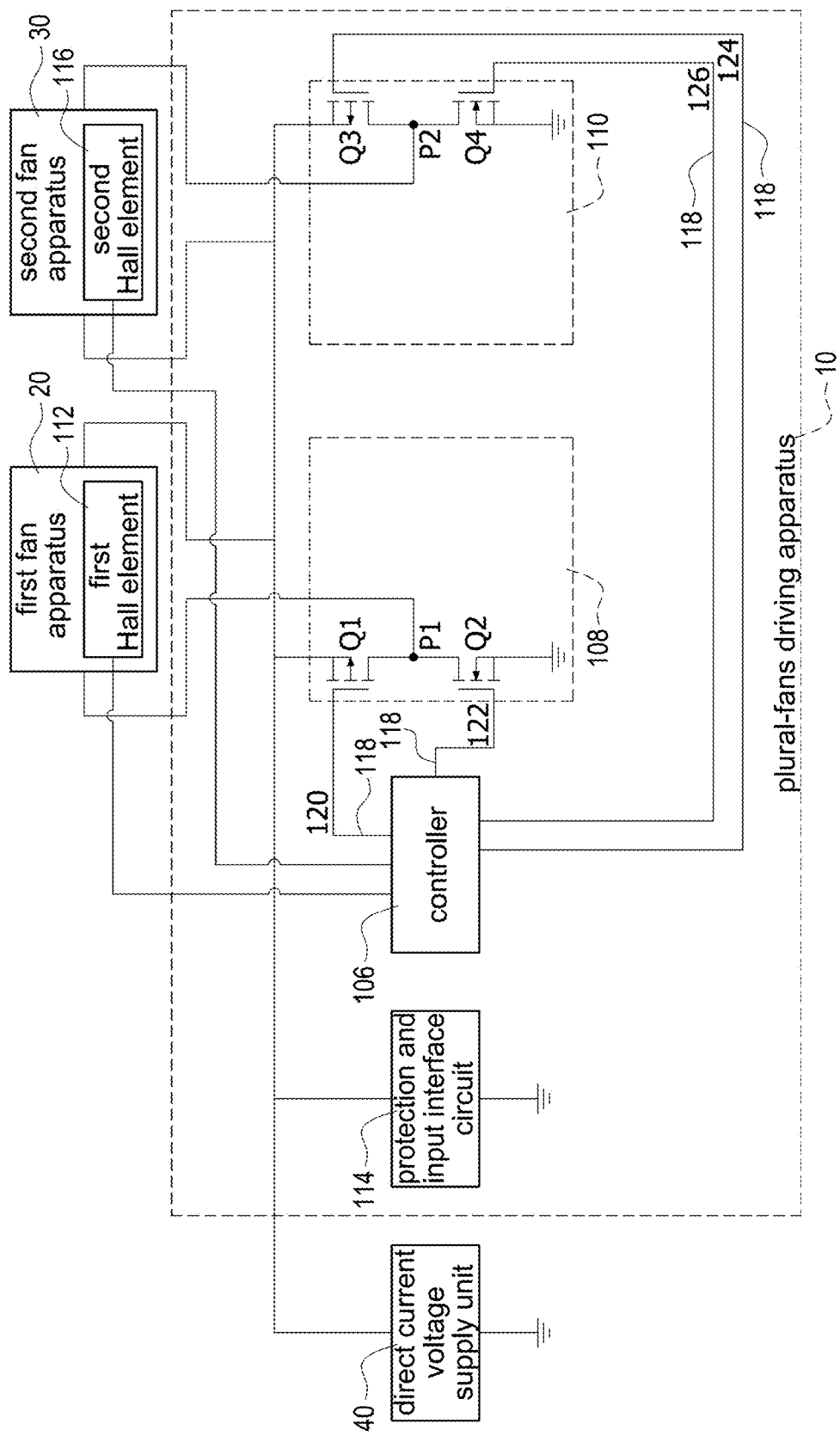
FIG. 5 shows a circuit diagram of the second embodiment of the plural-fans driving apparatus of the present disclosure.

FIG. 5 shows a circuit diagram of the second embodiment of the plural-fans driving apparatus of the present disclosure. The description for the elements shown in FIG. 5, which are similar to those shown in FIG. 1, is not repeated here for brevity.

The first fan driving circuit 108 comprises a first signal line 120, a second signal line 122, a first transistor switch Q1 and a second transistor switch Q2. The second fan driving circuit 110 comprises a third signal line 124, a fourth signal line 126, a third transistor switch Q3 and a fourth transistor switch Q4.

The first signal line 120 is electrically connected to the controller 106. The second signal line 122 is electrically connected to the controller 106. The first transistor switch Q1 is electrically connected to the first signal line 120, the first fan apparatus 20 and the protection and input interface circuit 114. The second transistor switch Q2 is electrically connected to the second signal line 122, the first fan apparatus 20 and the first transistor switch Q1. Moreover, the first transistor switch Q1 and the second transistor switch Q2 are electrically connected to a first common point P1. The first fan apparatus 20 is electrically connected to the first transistor switch Q1 and the second transistor switch Q2 through the first common point P1 mentioned above.

The third signal line 124 is electrically connected to the controller 106. The fourth signal line 126 is electrically connected to the controller 106. The third transistor switch Q3 is electrically connected to the third signal line 124, the second fan apparatus 30 and the protection and input interface circuit 114. The fourth transistor switch Q4 is electrically connected to the fourth signal line 126, the second fan apparatus 30 and the third transistor switch Q3. The third transistor switch Q3 and the fourth transistor switch Q4 are electrically connected to a second common point P2. The second fan apparatus 30 is electrically connected to the third transistor switch Q3 and the fourth transistor switch Q4 through the second common point P2 mentioned above.

Figure 6:
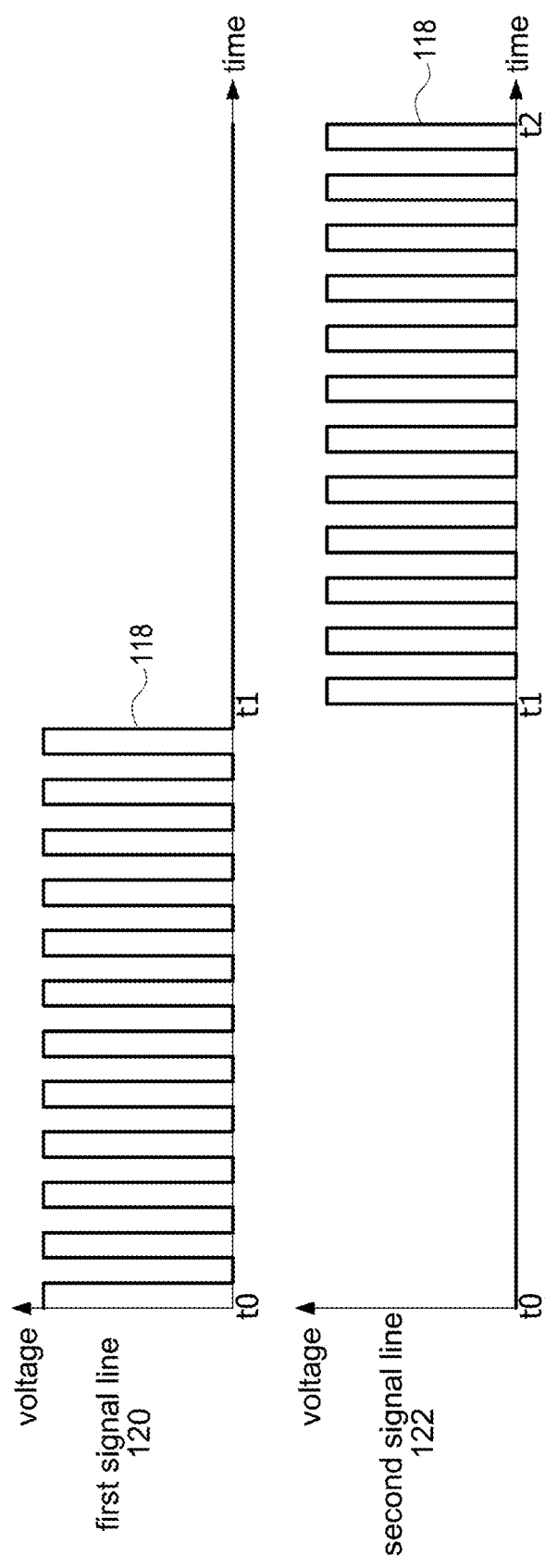
FIG. 6 shows waveform diagrams of the second embodiment of the plural-fans driving apparatus of the present disclosure.
Figure 7:
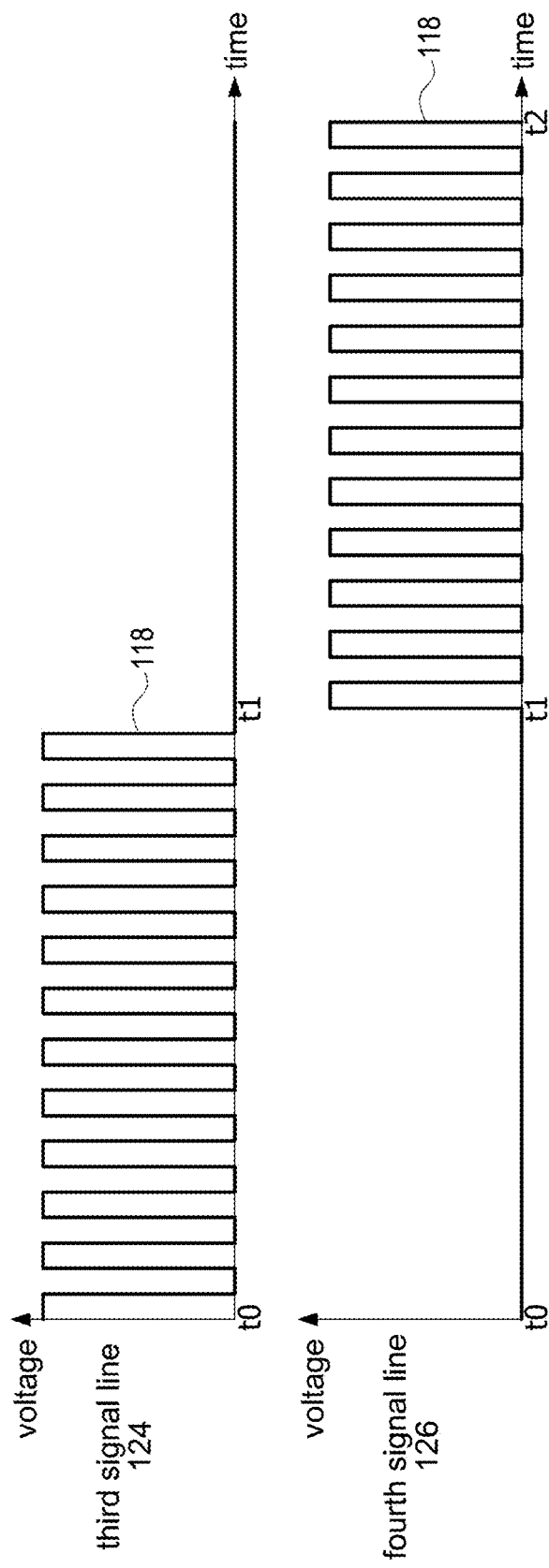
FIG. 7 shows waveform diagrams of the second embodiment of the plural-fans driving apparatus of the present disclosure.

FIG. 6 shows waveform diagrams of the second embodiment of the plural-fans driving apparatus of the present disclosure. FIG. 7 shows waveform diagrams of the second embodiment of the plural-fans driving apparatus of the present disclosure. Please refer to FIG. 5 at the same time.

Between the timing t0 and the timing t1, the controller 106 sends a pulse width modulation signal 118 through the first signal line 120 to the first transistor switch Q1 to drive the first transistor switch Q1. At this time, the controller 106 does not turn on the second transistor switch Q2. In another word, between the timing t0 and the timing t1, the controller 106 controls the first transistor switch Q1 by the pulse width modulation signal 118.

Between the timing t1 and the timing t2, the controller 106 sends the pulse width modulation signal 118 through the second signal line 122 to the second transistor switch Q2 to drive the second transistor switch Q2. At this time, the controller 106 does not turn on the first transistor switch Q1. In another word, between the timing t1 and the timing t2, the controller 106 controls the second transistor switch Q2 by the pulse width modulation signal 118 to drive the first fan apparatus 20.

Between the timing t0 and the timing t1, the controller 106 sends the pulse width modulation signal 118 through the third signal line 124 to the third transistor switch Q3 to drive the third transistor switch Q3. At this time, the controller 106 does not turn on the fourth transistor switch Q4.

Between the timing t1 and the timing t2, the controller 106 sends the pulse width modulation signal 118 through the fourth signal line 126 to the fourth transistor switch Q4 to drive the fourth transistor switch Q4. At this time, the controller 106 does not turn on the third transistor switch Q3. In another word, between the timing t1 and the timing t2, the controller 106 controls the fourth transistor switch Q4 by the pulse width modulation signal 118 to drive the second fan apparatus 30.

Figure 8:
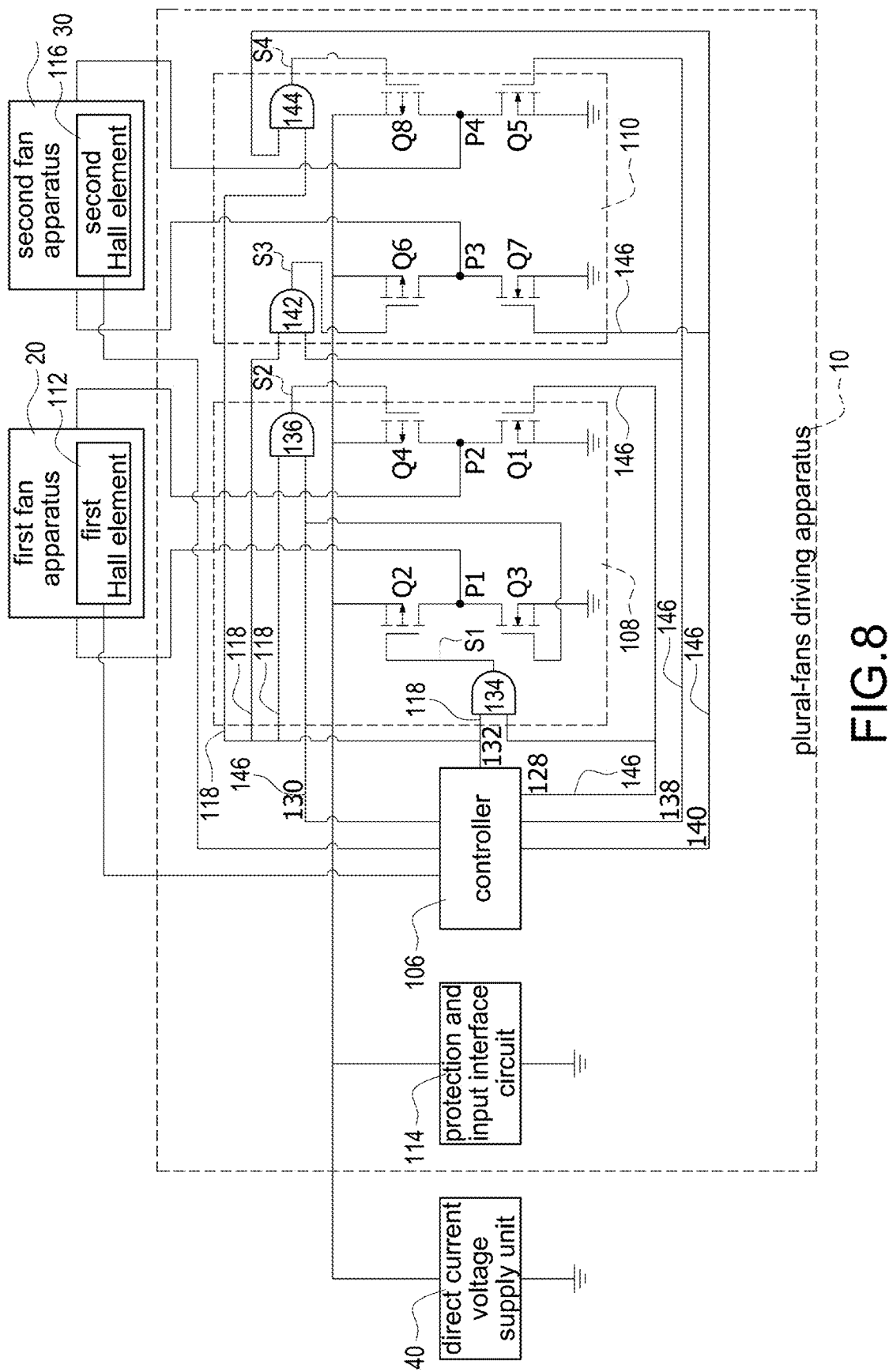
FIG. 8 shows a circuit diagram of the third embodiment of the plural-fans driving apparatus of the present disclosure.

FIG. 8 shows a circuit diagram of the third embodiment of the plural-fans driving apparatus of the present disclosure. The description for the elements shown in FIG. 8, which are similar to those shown in FIG. 1, is not repeated here for brevity.

The first fan driving circuit 108 comprises a first driving line 128, a second driving line 130, a pulse width modulation signal transmission line 132, a first AND gate unit 134, a second AND gate unit 136, a first transistor switch Q1, a second transistor switch Q2, a third transistor switch Q3 and a fourth transistor switch Q4. The second fan driving circuit 110 comprises a third driving line 138, a fourth driving line 140, a third AND gate unit 142, a fourth AND gate unit 144, a fifth transistor switch Q5, a sixth transistor switch Q6, a seventh transistor switch Q7 and an eighth transistor switch Q8.

The first driving line 128 is electrically connected to the controller 106. The second driving line 130 is electrically connected to the controller 106. The pulse width modulation signal transmission line 132 is electrically connected to the controller 106. The first AND gate unit 134 is electrically connected to the first driving line 128 and the pulse width modulation signal transmission line 132. The second AND gate unit 136 is electrically connected to the second driving line 130 and the pulse width modulation signal transmission line 132. The first transistor switch Q1 is electrically connected to the first driving line 128 and the first fan apparatus 20. The second transistor switch Q2 is electrically connected to the first AND gate unit 134, the first fan apparatus 20 and the protection and input interface circuit 114. The third transistor switch Q3 is electrically connected to the second driving line 130, the first fan apparatus 20 and the second transistor switch Q2. The fourth transistor switch Q4 is electrically connected to the second AND gate unit 136, the first fan apparatus 20, the protection and input interface circuit 114 and the first transistor switch Q1. Moreover, the second transistor switch Q2 and the third transistor switch Q3 are electrically connected to a first common point P1. The first fan apparatus 20 is electrically connected to the second transistor switch Q2 and the third transistor switch Q3 through the first common point P1 mentioned above. The first transistor switch Q1 and the fourth transistor switch Q4 are electrically connected to a second common point P2. The first fan apparatus 20 is electrically connected to the first transistor switch Q1 and the fourth transistor switch Q4 through the second common point P2 mentioned above.

The third driving line 138 is electrically connected to the controller 106. The fourth driving line 140 is electrically connected to the controller 106. The third AND gate unit 142 is electrically connected to the third driving line 138 and the pulse width modulation signal transmission line 132. The fourth AND gate unit 144 is electrically connected to the fourth driving line 140 and the pulse width modulation signal transmission line 132. The fifth transistor switch Q5 is electrically connected to the third driving line 138 and the second fan apparatus 30. The sixth transistor switch Q6 is electrically connected to the third AND gate unit 142, the second fan apparatus 30 and the protection and input interface circuit 114. The seventh transistor switch Q7 is electrically connected to the fourth driving line 140, the second fan apparatus 30 and the sixth transistor switch Q6. The eighth transistor switch Q8 is electrically connected to the fourth AND gate unit 144, the second fan apparatus 30, the protection and input interface circuit 114 and the fifth transistor switch Q5. Moreover, the sixth transistor switch Q6 and the seventh transistor switch Q7 are electrically connected to a third common point P3. The second fan apparatus 30 is electrically connected to the sixth transistor switch Q6 and the seventh transistor switch Q7 through the third common point P3 mentioned above. The fifth transistor switch Q5 and the eighth transistor switch Q8 are electrically connected to a fourth common point P4. The second fan apparatus 30 is electrically connected to the fifth transistor switch Q5 and the eighth transistor switch Q8 through the fourth common point P4 mentioned above.

Figure 9:
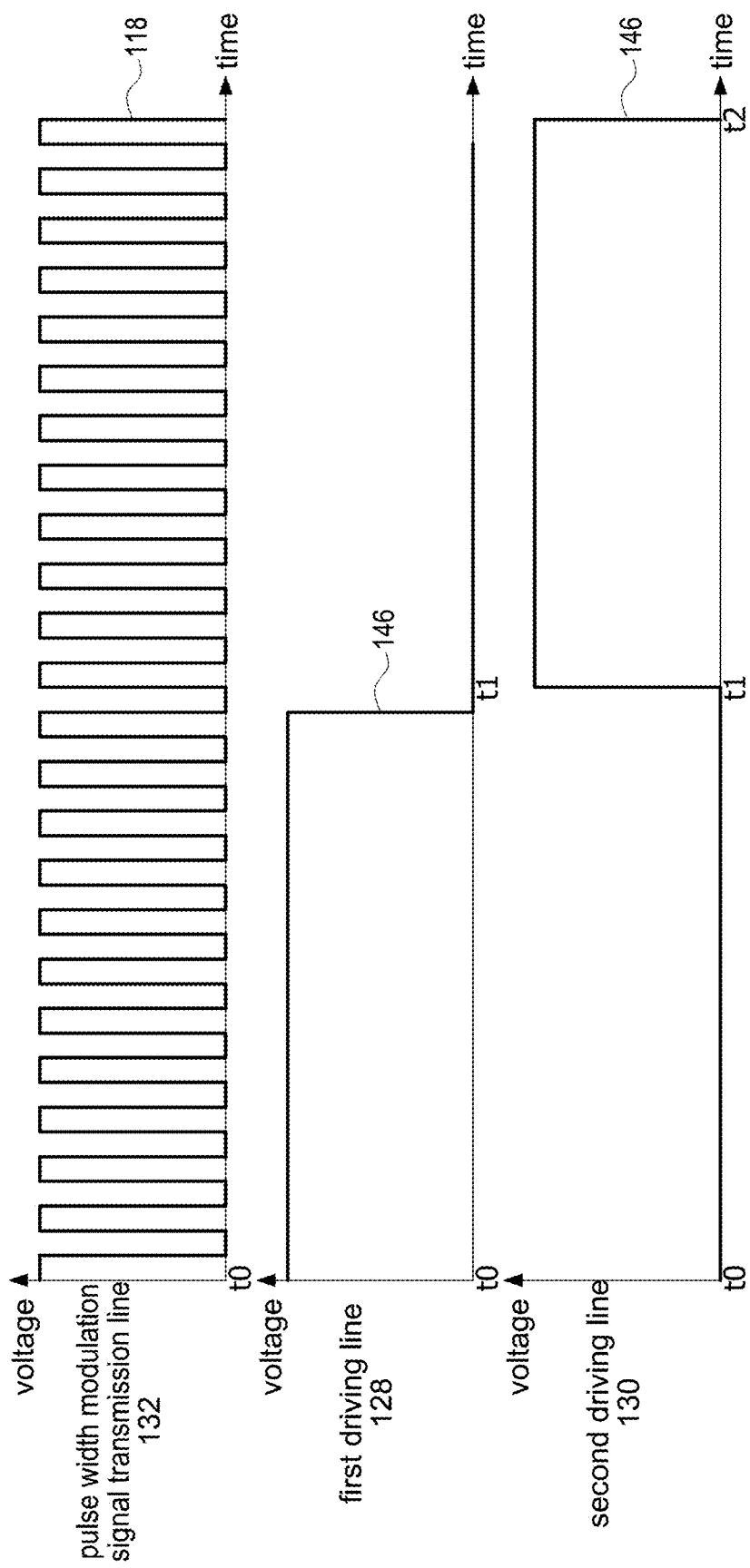
FIG. 9 shows waveform diagrams of the third embodiment of the plural-fans driving apparatus of the present disclosure.
Figure 10:
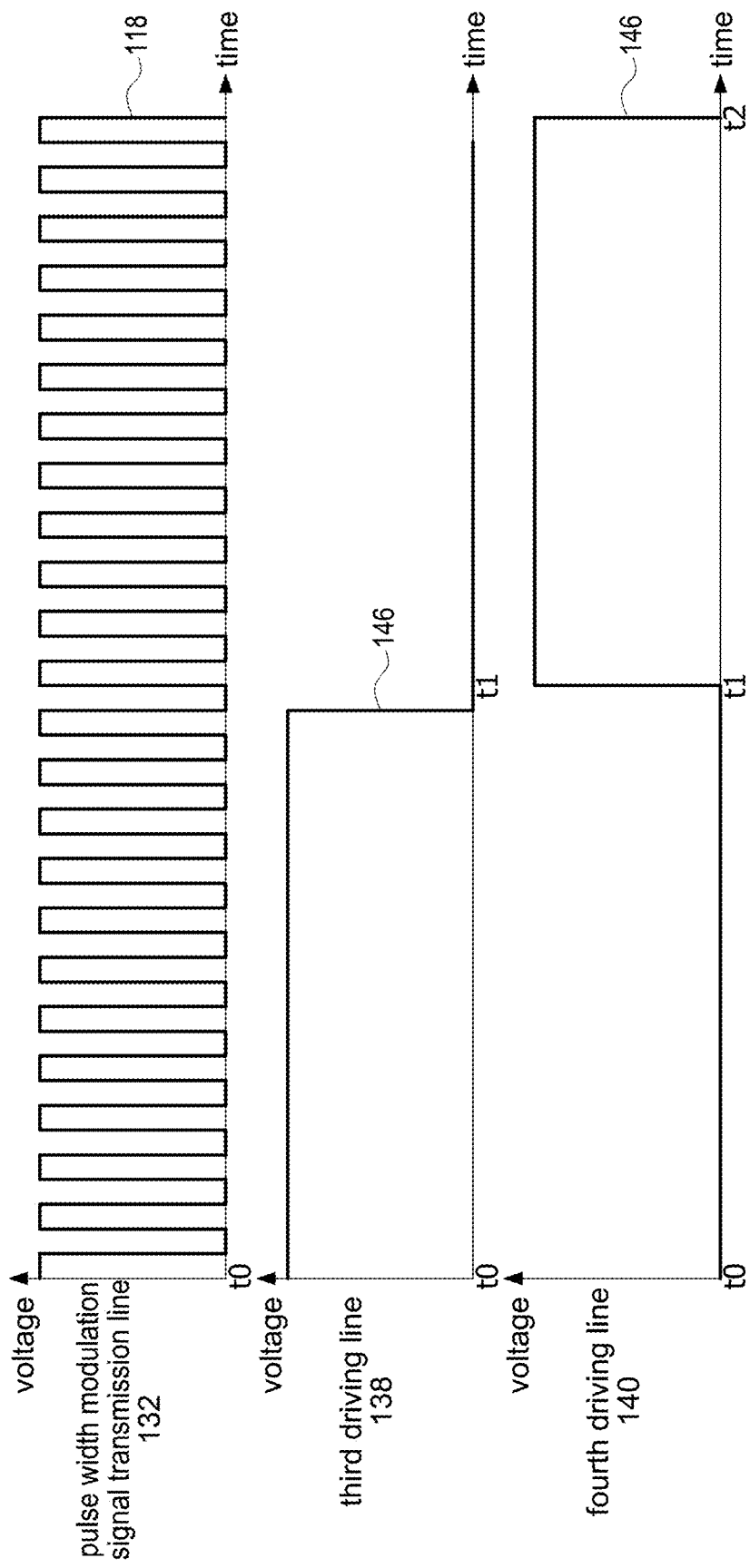
FIG. 10 shows waveform diagrams of the third embodiment of the plural-fans driving apparatus of the present disclosure.

FIG. 9 shows waveform diagrams of the third embodiment of the plural-fans driving apparatus of the present disclosure. FIG. 10 shows waveform diagrams of the third embodiment of the plural-fans driving apparatus of the present disclosure. Please refer to FIG. 8 at the same time.

The controller 106 sends a pulse width modulation signal 118 to the first AND gate unit 134, the second AND gate unit 136, the third AND gate unit 142 and the fourth AND gate unit 144 through the pulse width modulation signal transmission line 132.

Between the timing t0 and the timing t1, the controller 106 sends a conduction signal 146 through the first driving line 128 to the first transistor switch Q1 and the first AND gate unit 134. At this time, the first transistor switch Q1 is driven, and according to the pulse width modulation signal 118 and the conduction signal 146, the first AND gate unit 134 outputs a first driving signal S1 to drive the second transistor switch Q2. Besides, between the timing t0 and the timing t1, the controller 106 does not send the conduction signal 146 to the third transistor switch Q3 and the second AND gate unit 136, so that the third transistor switch Q3 and the fourth transistor switch Q4 are not turned on. In another word, between the timing t0 and the timing t1, the controller 106 controls the first transistor switch Q1 and the second transistor switch Q2 by the conduction signal 146 and the pulse width modulation signal 118 to drive the first fan apparatus 20.

Between the timing t1 and the timing t2, the controller 106 sends the conduction signal 146 through the second driving line 130 to the third transistor switch Q3 and the second AND gate unit 136. At this time, the third transistor switch Q3 is driven, and according to the pulse width modulation signal 118 and the conduction signal 146, the second AND gate unit 136 outputs a second driving signal S2 to drive the fourth transistor switch Q4. Besides, between the timing t1 and the timing t2, the controller 106 does not send the conduction signal 146 to the first transistor switch Q1 and the first AND gate unit 134, so that the first transistor switch Q1 and the second transistor switch Q2 are not turned on. In another word, between the timing t1 and the timing t2, the controller 106 drives the third transistor switch Q3 and the fourth transistor switch Q4 by the conduction signal 146 and the pulse width modulation signal 118 to drive the first fan apparatus 20.

Between the timing t0 and the timing t1, the controller 106 sends the conduction signal 146 through the third driving line 138 to the fifth transistor switch Q5 and the third AND gate unit 142. At this time, the fifth transistor switch Q5 is driven, and according to the pulse width modulation signal 118 and the conduction signal 146, the third AND gate unit 142 outputs a third driving signal S3 to drive the sixth transistor switch Q6. Besides, between the timing t0 and the timing t1, the controller 106 does not send the conduction signal 146 to the seventh transistor switch Q7 and the fourth AND gate unit 144, so that the seventh transistor switch Q7 and the eighth transistor switch Q8 are not turned on. In another word, between the timing t0 and the timing t1, the controller 106 drives the fifth transistor switch Q5 and the sixth transistor switch Q6 by the conduction signal 146 and the pulse width modulation signal 118 to drive the second fan apparatus 30.

Between the timing t1 and the timing t2, the controller 106 sends the conduction signal 146 through the fourth driving line 140 to the seventh transistor switch Q7 and the fourth AND gate unit 144. At this time, the seventh transistor switch Q7 is driven, and according to the pulse width modulation signal 118 and the conduction signal 146, the fourth AND gate unit 144 outputs a fourth driving signal S4 to drive the eighth transistor switch Q8. Besides, between the timing t1 and the timing t2, the controller 106 does not send the conduction signal 146 to the fifth transistor switch Q5 and the third AND gate unit 142, so that the fifth transistor switch Q5 and the sixth transistor switch Q6 are not turned on. In another word, between the timing t1 and the timing t2, the controller 106 controls the seventh transistor switch Q7 and the eighth transistor switch Q8 by the conduction signal 146 and the pulse width modulation signal 118 to drive the second fan apparatus 30.

The driving circuits shown in FIG. 5 are half bridge driving circuits. The driving circuits shown in FIG. 8 and FIG. 2 are full bridge driving circuits. Moreover, the controller 106 shown in FIG. 8 only needs two output pins to output the conduction signal 146 and the pulse width modulation signal 118 mentioned above. Therefore, controlling a plurality of fan apparatuses (such as the first fan apparatus 20 and the second fan apparatus 30 shown in FIG. 8) is achieved. The quantity of the pins of the controller 106 shown in FIG. 8 is less than the quantity of the pins of the controller 106 shown in FIG. 2, so that the design of the controller 106 shown in FIG. 8 is easier.

Figure 11:
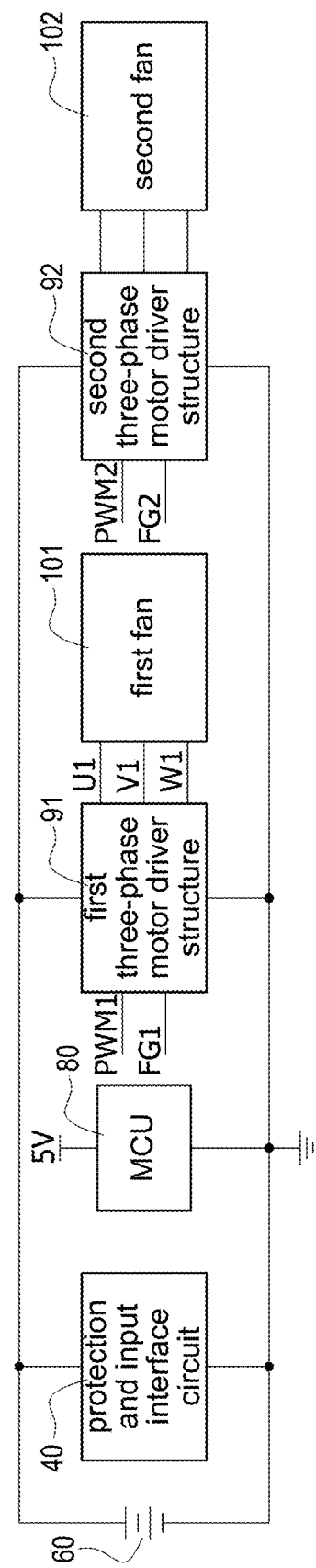
FIG. 11 shows a circuit diagram of the fourth embodiment of the plural-fans driving apparatus of the present disclosure.

Please refer to FIG. 11, which shows a circuit diagram of the fourth embodiment of the plural-fans driving apparatus of the present disclosure. A plural-fans driving apparatus 10' is applied to a DC voltage supply unit 60, and the DC voltage supply unit 60 is, for example but not limited to, a battery. The plural-fans driving apparatus 10' is used to drive a first fan 101 and a second fan 102. In comparison with the aforementioned plural-fans driving apparatus 10, the first fan 101 and the second fan 102 are three-phase fans.

The plural-fans driving apparatus 10' includes a controller 80, a first three-phase motor driver structure 91, a second three-phase motor driver structure 92, and a protection and input interface circuit 70. The first three-phase motor driver structure 91 is a senseless motor driver structure for driving the first fan 101. Similarly, the second three-phase motor driver structure 92 is a senseless motor driver structure for driving the second fan 102.

The first three-phase motor driver structure 91 is coupled to the DC voltage supply unit 60, and is supplied power by the DC voltage supply unit 60. The second three-phase motor driver structure 92 is coupled to the DC voltage supply unit 60, and is supplied power by the DC voltage supply unit 60. Further, the first three-phase motor driver structure 91 is coupled to the protection and input interface circuit 70, and the first three-phase motor driver structure 91 is protected by the protection and input interface circuit 70. The second three-phase motor driver structure 92 is coupled to the protection and input interface circuit 70, and the second three-phase motor driver structure 92 is protected by the protection and input interface circuit 70. In other words, the protection and input interface circuit 70 is a common input interface for the first three-phase motor driver structure 91 and the second three-phase motor driver structure 92.

The first three-phase motor driver structure 91 is coupled to the controller 80 and the first fan 101. The second three-phase motor driver structure 92 is coupled to the controller 80, the first three-phase motor driver structure 91, and the second fan 102.

The controller 80 controls the first three-phase motor driver structure 91 to drive the first fan 101. The controller 80 controls the second three-phase motor driver structure 92 to drive the second fan 102. In particular, the controller 80 is, for example but not limited to, driven by a voltage with 5 volts.

The controller 80 generates a speed control signal PWM. In this embodiment, the speed control signal PWM is a pulse width modulation (PWM) signal. The PWM signal generated by the controller 80 is simultaneously used to control the first fan 101 and the second fan 102 through the first three-phase motor driver structure 91 and the second three-phase motor driver structure 92, respectively. By adjusting (controlling) a duty cycle of the PWM signal, the first fan 101 and the second fan 102 can rotate in the same speed or in different speeds.

The advantage of the present disclosure is to decrease the cost (to save cost) of the plural-fans driving apparatus and to decrease the volume (increase utilization of a circuit board) of the plural-fans driving apparatus.

Although the present disclosure has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A plural-fans driving apparatus driving a first fan and a second fan, wherein the first fan and the second fan are three-phase fans, the plural-fans driving apparatus comprising:
a controller,
a first three-phase motor driver structure coupled to the controller and the first fan,
a second three-phase motor driver structure coupled to the controller, the first three-phase motor driver structure, and the second fan, and
a protection and input interface circuit coupled in parallel to the first three-phase motor driver structure and the second three-phase motor driver structure, and configured to protect the first three-phase motor driver structure and the second three-phase motor driver structure,
wherein the controller is configured to control the first three-phase motor driver structure to drive the first fan, and the controller is configured to control the second three-phase motor driver structure to drive the second fan, and the operation of driving the first fan by the first three-phase motor driver structure is independent of the operation of driving the second fan by the second three-phase motor driver structure.

2. The plural-fans driving apparatus in claim 1, wherein the controller is configured to generate a speed control signal to simultaneously control the first fan and the second fan through the first three-phase motor driver structure and the second three-phase motor driver structure, respectively.

3. The plural-fans driving apparatus in claim 2, wherein the speed control signal is a pulse width modulation signal.

4. The plural-fans driving apparatus in claim 3, wherein a duty cycle of the speed control signal is adjusted to control the first fan and the second fan rotating in the same speed or in different speeds.

5. The plural-fans driving apparatus in claim 1, wherein the protection and input interface circuit is coupled in parallel to the first three-phase motor driver structure and the second three-phase motor driver structure to provide a common input interface for the first three-phase motor driver structure and the second three-phase motor driver structure.

6. The plural-fans driving apparatus in claim 1, wherein the first three-phase motor driver structure is a senseless motor driver structure for driving the first fan, and the second three-phase motor driver structure is a senseless motor driver structure for driving the second fan.

7. The plural-fans driving apparatus in claim 1, wherein the first three-phase motor driver structure and the second three-phase motor driver structure are coupled in parallel to a DC voltage supply unit, and the first three-phase motor driver structure and the second three-phase motor driver structure are supplied power by the DC voltage supply unit.

8. The plural-fans driving apparatus in claim 1, wherein the DC voltage supply unit is a battery.

* * * * *